(12) United States Patent
Wei et al.

(10) Patent No.: US 12,189,197 B2
(45) Date of Patent: Jan. 7, 2025

(54) OPTICAL FIBER CONNECTOR, SINGLE-FIBER BIDIRECTIONAL OPTICAL ASSEMBLY, AND OPTICAL FIBER TRANSMISSION SYSTEM

(71) Applicant: HUAWEI TECHNOLOGIES CO., LTD., Guangdong (CN)

(72) Inventors: Su Wei, Dongguan (CN); Shu Li, Dongguan (CN); Zhifang Fang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 17/933,118

(22) Filed: Sep. 18, 2022

(65) Prior Publication Data

US 2023/0007943 A1   Jan. 12, 2023

Related U.S. Application Data

(63) Continuation of application No. PCT/CN2021/081715, filed on Mar. 19, 2021.

(30) Foreign Application Priority Data

Mar. 24, 2020   (CN) .......................... 202010212736.0

(51) Int. Cl.
*H04B 10/00* (2013.01)
*G02B 6/42* (2006.01)

(52) U.S. Cl.
CPC ................................ *G02B 6/4246* (2013.01)

(58) Field of Classification Search
CPC .... G02B 6/4246; G02B 6/421; G02B 6/4214; G02B 6/4215
See application file for complete search history.

(56) References Cited

U.S. PATENT DOCUMENTS

| 7,364,374 | B2* | 4/2008 | Liu | G02B 6/4246 |
| | | | | 385/94 |
| 8,335,411 | B2* | 12/2012 | Kuznia | G02B 6/4214 |
| | | | | 385/47 |
| 2005/0084217 | A1* | 4/2005 | Yoshimura | G02B 6/4214 |
| | | | | 385/88 |

(Continued)

FOREIGN PATENT DOCUMENTS

| CN | 101030879 A | 9/2007 |
| CN | 101174007 A | 5/2008 |

(Continued)

*Primary Examiner* — Agustin Bello

(57) ABSTRACT

An optical fiber connector, a single-fiber bidirectional optical assembly, and an optical fiber transmission system are provided. The optical fiber connector is used in a single-fiber bidirectional optical assembly that includes a first optical module and a light filter. The optical fiber connector includes an optical path changing module, an optical fiber, a ferrule, and a tube. The optical fiber is disposed in the ferrule, the optical path changing module is in physical contact with the ferrule, the optical path changing module and the ferrule are fastened through the tube, and an optical path port is disposed at a location that is on the tube opposite from the first optical module. The optical path changing module is configured to change a transmission path of a first optical signal.

8 Claims, 9 Drawing Sheets

(56) References Cited

U.S. PATENT DOCUMENTS

| | | | |
|---|---|---|---|
| 2006/0013541 A1* | 1/2006 | Plickert | G02B 6/4246 |
| | | | 385/47 |
| 2007/0098335 A1* | 5/2007 | Baek | G02B 6/4246 |
| | | | 385/94 |
| 2008/0310853 A1 | 12/2008 | Koh et al. | |
| 2011/0052125 A1 | 3/2011 | Lee et al. | |
| 2013/0089337 A1 | 4/2013 | Kim et al. | |
| 2014/0355997 A1* | 12/2014 | Miao | H04B 10/40 |
| | | | 398/135 |
| 2017/0134099 A1 | 5/2017 | Hara et al. | |
| 2020/0309638 A1* | 10/2020 | Kuznia | G02B 6/4214 |
| 2023/0007943 A1* | 1/2023 | Wei | G02B 6/4214 |

FOREIGN PATENT DOCUMENTS

| | | |
|---|---|---|
| CN | 106353861 A | 1/2017 |
| CN | 107748409 A | 3/2018 |
| CN | 110058362 A | 7/2019 |
| CN | 110380809 A | 10/2019 |
| CN | 209690568 U | 11/2019 |
| CN | 110794526 A | 2/2020 |
| JP | 2007017903 A | 1/2007 |
| KR | 20160120385 A | 10/2016 |

* cited by examiner

OPTICAL FIBER CONNECTOR, SINGLE-FIBER BIDIRECTIONAL OPTICAL ASSEMBLY, AND OPTICAL FIBER TRANSMISSION SYSTEM

CROSS-REFERENCE TO RELATED APPLICATIONS

This application is a continuation of International Application No. PCT/CN2021/081715, filed on Mar. 19, 2021, which claims priority to Chinese Patent Application No. 202010212736.0, filed on Mar. 24, 2020. The disclosures of the aforementioned applications are hereby incorporated by reference in their entireties.

TECHNICAL FIELD

This disclosure relates to the field of optical communication technologies, and in particular, to an optical fiber connector, a single-fiber bidirectional optical assembly, and an optical fiber transmission system.

BACKGROUND

Two-fiber bidirectional optical assemblies are widely used in optical fiber transmission systems. In an optical fiber transmission system, a same quantity of two-fiber bidirectional optical assemblies are separately disposed at a remote end and a local end, and a multiplexer/demultiplexer is separately disposed at the remote end and the local end. Each two-fiber bidirectional optical assembly includes one optical transmitter and one optical receiver, where the optical transmitter and the optical receiver each are connected to one optical fiber. If a data transmission amount of the optical fiber transmission system needs to be increased, the quantity of two-fiber bidirectional optical assemblies may be increased. In the optical fiber transmission system, a larger quantity of two-fiber bidirectional optical assemblies indicate that a larger quantity of optical fibers are needed. Consequently, cabling costs and network maintenance difficulty are increased.

Because only one optical fiber needs to be connected to one single-fiber bidirectional optical assembly, if single-fiber bidirectional optical assemblies are used in the optical fiber transmission system, a quantity of optical fibers can be reduced by half compared with that used in the optical fiber transmission system in which two-fiber bidirectional optical assemblies are used, and system costs can be reduced. One single-fiber bidirectional optical assembly may be connected to one optical fiber by using an optical fiber connector, to receive an optical signal and transmit an optical signal. However, the single-fiber bidirectional optical assembly needs to distinguish between the received optical signal and the transmitted optical signal. Currently, a single-fiber bidirectional optical assembly distinguishes between a received optical signal and a transmitted optical signal by disposing a light filter. Specifically, a film is coated on the light filter, so that the light filter can reflect an optical signal whose wavelength is λ1 and transmit an optical signal whose wavelength is λ2. In this way, the optical signal whose wavelength is λ1 and the optical signal whose wavelength is λ2 can be distinguished.

According to a current thin-film light filter coating technology, if optical signals with a smaller wavelength difference need to be distinguished, smaller incident angles of the optical signals are required. When a wavelength difference between two optical signals is small, incident angles of the optical signals can be changed by changing an offset angle of the light filter. In this way, a location of an optical receiving module in the single-fiber bidirectional optical assembly needs to be adjusted at the same time. If the incident angle is small to a specific extent, it is necessary to increase a volume of the single-fiber bidirectional optical assembly to dispose the optical receiving module in the single-fiber bidirectional optical assembly.

SUMMARY

According to a first aspect, an optical fiber connector is provided, where the optical fiber connector is used in a single-fiber bidirectional optical assembly. The single-fiber bidirectional optical assembly further includes a first optical module and a light filter. The optical fiber connector includes an optical path changing module, an optical fiber, a ferrule, and a tube. The optical fiber is disposed in the ferrule, the optical path changing module is in physical contact with the ferrule, the optical path changing module and the ferrule are fastened/secured through the tube, and an optical path port is disposed at a location that is on the tube and that opposites to the first optical module. The optical path changing module is configured to change a transmission path of a first optical signal, where the first optical signal is an optical signal that enters the optical path changing module after being reflected by the light filter, or an optical signal that is transmitted by the first optical module and that enters the optical path changing module through the optical path port. The transmission path includes a first path segment, a second path segment, and a third path segment, where the first path segment is a path that is between the first optical module and the optical path changing module and that passes through the optical path port, the second path segment is a path between the optical path changing module and the light filter, and the third path segment is a path between the light filter and the optical fiber.

The optical path changing module can change the transmission path of the first optical signal. The first optical signal may be an optical signal that enters the optical path changing module after being reflected by the light filter. The optical path changing module changes the transmission path of the first optical signal, so that the first optical signal enters the first optical module through the optical path port. Alternatively, the first optical signal may be an optical signal that is transmitted by the first optical module and that enters the optical path changing module through the optical path port. The optical path changing module can change the transmission path of the first optical signal so that the first optical signal enters the optical fiber after being reflected by the light filter. When the single-fiber bidirectional optical assembly distinguishes between beams with a small wavelength difference, after an offset angle of the light filter is changed, the transmission path of the first optical signal can be changed by the optical path changing module so that the first optical module can transmit or receive the first optical signal through the optical path port. In this way, there is no need to adjust a location of the first optical module or increase a volume of the single-fiber bidirectional optical assembly.

Optionally, with reference to the first aspect, in a first possible implementation, when the first optical module is an optical receiving module, the optical path changing module is configured to transmit, to the light filter through the third path segment, a second optical signal received from the optical fiber, and transmit reflected light from the second path segment to the optical receiving module through the first path segment, where the reflected light is obtained through reflection of the second optical signal by the light filter. In this implementation, the optical path changing module can change a transmission path of the second optical signal so that the second optical signal enters the optical receiving module through the optical path port. When the single-fiber bidirectional optical assembly distinguishes between beams with a small wavelength difference, after an offset angle of the light filter is changed, the transmission path of the second optical signal can be changed by the optical path changing module so that the optical receiving module can receive the second optical signal through the optical path port. In this way, there is no need to adjust a location of the optical receiving module or increase a volume of the single-fiber bidirectional optical assembly.

Optionally, with reference to the first aspect, in a second possible implementation of the first aspect, when the first optical module is an optical transmitting module, the optical path changing module is configured to transmit a third optical signal from the first path segment to the light filter through the second path segment, and transmit, to the optical fiber through the third path segment, reflected light obtained through reflection of the third optical signal by the light filter, where the third optical signal is transmitted by the optical transmitting module through the first path segment. In this implementation, the optical path changing module can change a transmission path of the third optical signal, so that the third optical signal transmitted by the optical transmitting module enters the optical fiber after being reflected by the light filter. When the single-fiber bidirectional optical assembly distinguishes between beams with a small wavelength difference, after an offset angle of the light filter is changed, the transmission path of the third optical signal can be changed by the optical path changing module, so that the third optical signal enters the optical fiber after being reflected by the light filter. In this way, there is no need to adjust a location of the optical receiving module or the optical transmitting module or increase a volume of the single-fiber bidirectional optical assembly.

Optionally, with reference to the first aspect, in a third possible implementation of the first aspect, the optical path changing module is a lens, and the lens and the ferrule are laminated to form a reflective surface. The reflective surface may be configured to reflect an optical signal that enters the lens after being reflected by the light filter, so that the optical signal enters the first optical module through the optical path port. The optical path changing module may be alternatively configured to reflect the optical signal that enters the lens through the optical path port, so that the optical signal enters the optical fiber after being reflected by the light filter. When the single-fiber bidirectional optical assembly distinguishes between beams with a small wavelength difference, after an offset angle of the light filter is changed, a transmission path of the optical signal can be changed by the optical path changing module, so that the first optical module can transmit or receive the optical signal through the optical path port. In this way, there is no need to adjust a location of the first optical module or increase a volume of the single-fiber bidirectional optical assembly.

Optionally, with reference to the first aspect, in a fourth possible implementation of the first aspect, the optical path changing module includes a lens and an optical waveguide, where the optical waveguide is disposed in the ferrule, one end of the optical waveguide is connected to the lens, and the other end of the optical waveguide is connected to the optical path port of the tube. The optical waveguide is configured to transmit, to the optical path port, an optical signal that enters the lens after being reflected by the light filter, or is configured to transmit, to the lens, an optical signal that enters the optical waveguide through the optical path port. When the single-fiber bidirectional optical assembly distinguishes between beams with a small wavelength difference, after an offset angle of the light filter is changed, a transmission path of the optical signal can be changed by the optical waveguide in the optical path changing module, so that the first optical module can transmit or receive the optical signal through the optical path port. In this way, there is no need to adjust a location of the first optical module or increase a volume of the single-fiber bidirectional optical assembly.

According to a second aspect, a single-fiber bidirectional optical assembly is provided. The single-fiber bidirectional optical assembly includes an optical fiber connector, a first optical module, and a light filter. The optical fiber connector includes an optical path changing module, an optical fiber, a ferrule, and a tube. The optical fiber is disposed in the ferrule, the optical path changing module is in physical contact with the ferrule, the optical path changing module are fastened through the tube, and an optical path port is disposed at a location that is on the tube and that opposites to the first optical module. The optical path changing module is configured to change a transmission path of a first optical signal, where the first optical signal is an optical signal that enters the optical path changing module after being reflected by the light filter, or an optical signal that is transmitted by the first optical module and that enters the optical path changing module through the optical path port. The transmission path includes a first path segment, a second path segment, and a third path segment, where the first path segment is a path that is between the first optical module and the optical path changing module and that passes through the optical path port, the second path segment is a path between the optical path changing module and the light filter, and the third path segment is a path between the light filter and the optical fiber.

The optical path changing module can change the transmission path of the first optical signal. The first optical signal may be an optical signal that enters the optical path changing module after being reflected by the light filter. The optical path changing module changes the transmission path of the first optical signal, so that the first optical signal enters the first optical module through the optical path port. Alternatively, the first optical signal may be an optical signal that is transmitted by the first optical module and that enters the optical path changing module through the optical path port. The optical path changing module can change the transmission path of the first optical signal, so that the first optical signal enters the optical fiber after being reflected by the light filter. When the single-fiber bidirectional optical assembly distinguishes between beams with a small wavelength difference, after an offset angle of the light filter is changed, the transmission path of the first optical signal can be changed by the optical path changing module, so that the first optical module can transmit or receive the first optical signal through the optical path port. In this way, there is no need to adjust a location of the first optical module or increase a volume of the single-fiber bidirectional optical assembly.

Optionally, with reference to the second aspect, in a first possible implementation of the second aspect, when the first optical module is an optical receiving module, the optical path changing module is configured to transmit, to the light filter through the third path segment, a second optical signal received from the optical fiber, and transmit reflected light from the second path segment to the optical receiving module through the first path segment, where the reflected light is obtained through reflection of the second optical signal by the light filter. In this implementation, the optical path changing module can change a transmission path of the second optical signal, so that the second optical signal enters the optical receiving module through the optical path port. When the single-fiber bidirectional optical assembly distinguishes between beams with a small wavelength difference, after an offset angle of the light filter is changed, the transmission path of the second optical signal can be changed by the optical path changing module, so that the optical receiving module can receive the second optical signal through the optical path port. In this way, there is no need to adjust a location of the optical receiving module or increase a volume of the single-fiber bidirectional optical assembly.

Optionally, with reference to the second aspect, in a second possible implementation of the second aspect, when the first optical module is an optical transmitting module, the optical path changing module is configured to transmit a third optical signal from the first path segment to the light filter through the second path segment, and transmit, to the optical fiber through the third path segment, reflected light obtained through reflection of the third optical signal by the light filter, where the third optical signal is transmitted by the optical transmitting module through the first path segment. In this implementation, the optical path changing module can change a transmission path of the third optical signal, so that the third optical signal transmitted by the optical transmitting module enters the optical fiber after being reflected by the light filter. When the single-fiber bidirectional optical assembly distinguishes between beams with a small wavelength difference, after an offset angle of the light filter is changed, the transmission path of the third optical signal can be changed by the optical path changing module, so that the third optical signal enters the optical fiber after being reflected by the light filter. In this way, there is no need to adjust a location of the optical receiving module or the optical transmitting module or increase a volume of the single-fiber bidirectional optical assembly.

Optionally, with reference to the second aspect, in a third possible implementation of the second aspect, the optical path changing module is a lens, and the lens and the ferrule are laminated to form a reflective surface. The reflective surface is configured to reflect an optical signal that enters the lens after being reflected by the light filter, so that the optical signal enters the first optical module through the optical path port. The reflective surface may be alternatively configured to reflect the optical signal that enters the lens through the optical path port, so that the optical signal enters the optical fiber after being reflected by the light filter. When the single-fiber bidirectional optical assembly distinguishes between beams with a small wavelength difference, after an offset angle of the light filter is changed, a transmission path of the optical signal can be changed by the optical path changing module, so that the first optical module can transmit or receive the optical signal through the optical path port. In this way, there is no need to adjust a location of the first optical module or increase a volume of the single-fiber bidirectional optical assembly.

Optionally, with reference to the second aspect, in a fourth possible implementation of the second aspect, the optical path changing module includes a lens and an optical waveguide, where the optical waveguide is disposed in the ferrule, one end of the optical waveguide is connected to the lens, and the other end of the optical waveguide is connected to the optical path port of the tube. The optical waveguide is configured to transmit, to the optical path port, an optical signal that enters the lens after being reflected by the light filter, or is configured to transmit, to the lens, an optical signal that enters the optical waveguide through the optical path port. When the single-fiber bidirectional optical assembly distinguishes between beams with a small wavelength difference, after an offset angle of the light filter is changed, a transmission path of the optical signal can be changed by the optical waveguide in the optical path changing module, so that the first optical module can transmit or receive the optical signal through the optical path port. In this way, there is no need to adjust a location of the first optical module or increase a volume of the single-fiber bidirectional optical assembly.

According to a third aspect of this application, an optical fiber transmission system is provided. The optical fiber transmission system includes: at least one remote single-fiber bidirectional optical assembly, a remote multiplexer/demultiplexer, a local multiplexer/demultiplexer, and at least one local single-fiber bidirectional optical assembly. Each single-fiber bidirectional optical assembly in the at least one remote single-fiber bidirectional optical assembly is connected to the remote multiplexer/demultiplexer by using one optical fiber. The remote multiplexer/demultiplexer is connected to the local multiplexer/demultiplexer by using one optical fiber. Each single-fiber bidirectional optical assembly in the at least one local single-fiber bidirectional optical assembly is connected to the local multiplexer/demultiplexer by using one optical fiber. The at least one remote single-fiber bidirectional optical assembly and the at least one local single-fiber bidirectional optical assembly each are the single-fiber bidirectional optical assembly in the second aspect and any possible implementation of the second aspect. Because the optical fiber transmission system uses the single-fiber bidirectional optical assembly, compared with an optical fiber transmission system using a two-fiber bidirectional optical assembly, a quantity of optical fibers can be reduced, and costs can be saved.

This application provides an optical fiber connector, a single-fiber bidirectional optical assembly, and an optical fiber transmission system. The optical fiber connector is used in the single-fiber bidirectional optical assembly. The single-fiber bidirectional optical assembly further includes a first optical module and a light filter. The optical fiber connector includes an optical path changing module, an optical fiber, a ferrule, and a tube. The optical fiber is disposed in the ferrule, the optical path changing module is in physical contact with the ferrule, the optical path changing module and the ferrule are fastened/secured through the tube, and an optical path port is disposed at a location that is on the tube and that opposites to the first optical module. The optical path changing module is configured to change a transmission path of a first optical signal, where the first optical signal is an optical signal that enters the optical path changing module after being reflected by the light filter, or an optical signal that is transmitted by the first optical module and that enters the optical path changing module through the optical path port. The transmission path includes a first path segment, a second path segment, and a third path segment, where the first path segment is a path that is between the first optical module and the optical path changing module and that passes through the optical path port, the second path segment is a path between the optical path changing module and the light filter, and the third path segment is a path between the light filter and the optical fiber.

The optical path changing module can change the transmission path of the first optical signal. The first optical signal may be an optical signal that enters the optical path changing module after being reflected by the light filter. The optical path changing module changes the transmission path of the first optical signal, so that the first optical signal enters the first optical module through the optical path port. Alternatively, the first optical signal may be an optical signal that is transmitted by the first optical module and that enters the optical path changing module through the optical path port. The optical path changing module can change the transmission path of the first optical signal, so that the first optical signal enters the optical fiber after being reflected by the light filter. When the single-fiber bidirectional optical assembly distinguishes between beams with a small wavelength difference, after an offset angle of the light filter is changed, the transmission path of the first optical signal can be changed by the optical path changing module, so that the first optical module can transmit or receive the first optical signal through the optical path port. In this way, there is no need to adjust a location of the first optical module or increase a volume of the single-fiber bidirectional optical assembly.

DESCRIPTION OF EMBODIMENTS

The following description clearly describes the technical solutions in embodiments with reference to the accompanying drawings. It is clear that the described embodiments are merely illustrative of some but not all embodiments. All other embodiments obtained by persons skilled in the art based on this disclosure without creative efforts shall fall within the protection scope of this disclosure.

In the specification, claims, and accompanying drawings, the terms "first", "second", and the like are intended to distinguish between similar objects but do not necessarily indicate a specific order or sequence. It should be understood that the data termed in such a way are interchangeable in proper circumstances so that embodiments described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device.

Two-fiber bidirectional optical assemblies are widely used in optical fiber transmission systems. In an optical fiber transmission system, a same quantity of two-fiber bidirectional optical assemblies are separately disposed at a remote end and a local end, and a multiplexer/demultiplexer is separately disposed at the remote end and the local end. Each two-fiber bidirectional optical assembly includes one optical transmitter and one optical receiver, where the optical transmitter and the optical receiver each are connected to one optical fiber.

Figure 1:
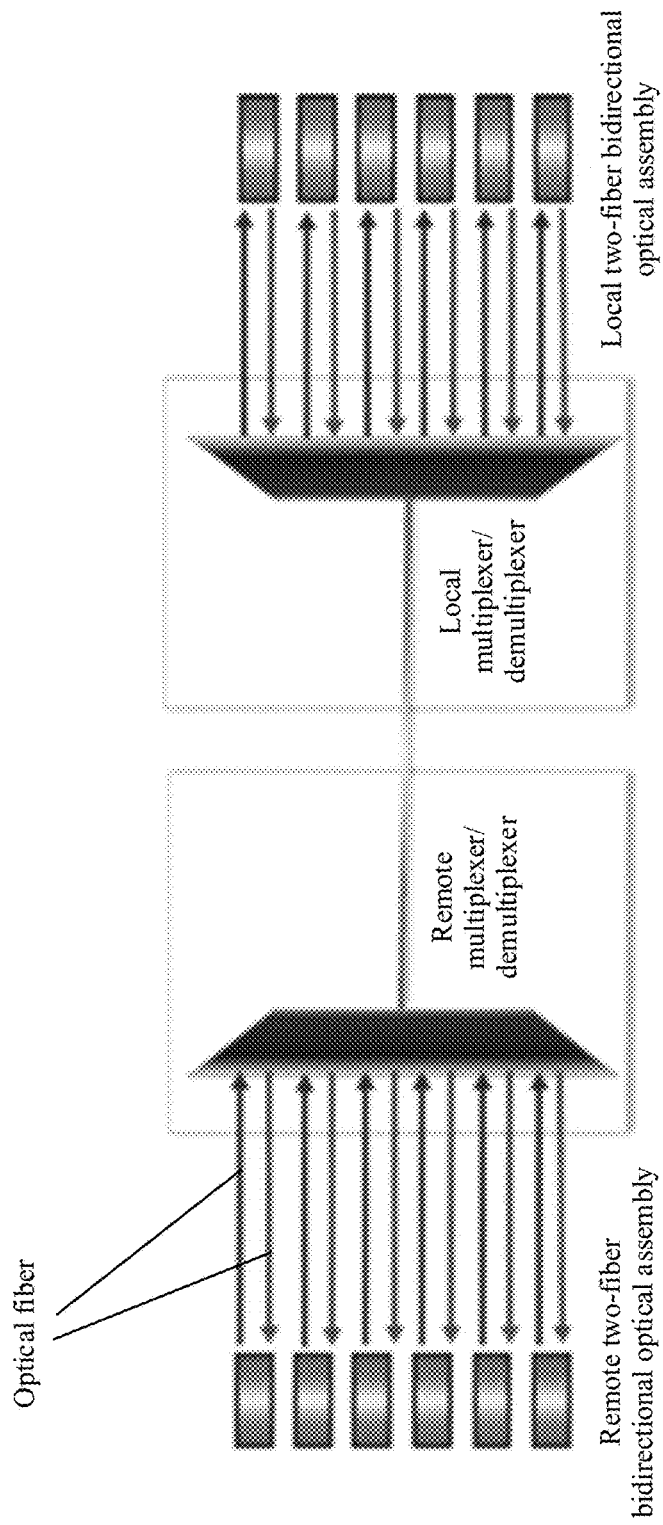
FIG. 1 is a schematic diagram of an optical fiber transmission system according to this disclosure.

Refer to an optical fiber transmission system shown in FIG. 1. The optical fiber transmission system has six two-fiber bidirectional optical assemblies at each of a remote end and a local end, and a multiplexer/demultiplexer is separately disposed at the remote end and the local end. Each two-fiber bidirectional optical assembly includes an optical transmitting module and an optical receiving module. The optical transmitting module and the optical receiving module are separately connected to one optical fiber. When the optical fiber transmission system operates, the optical transmitting module in the remote two-fiber bidirectional optical assembly can transmit an optical signal to the remote multiplexer/demultiplexer through the optical fiber. The remote multiplexer/demultiplexer can combine optical signals transmitted by a plurality of remote two-fiber bidirectional optical assemblies, and then transmit a combined optical signal to the local multiplexer/demultiplexer through one optical fiber. The local multiplexer/demultiplexer splits the received optical signal based on wavelengths, and transmits obtained optical signals to corresponding local two-fiber bidirectional optical assemblies in a plurality of local two-fiber bidirectional optical assemblies, respectively. The local two-fiber bidirectional optical assembly receives the optical signal by using the optical receiving module. It should be noted that wavelengths of beams transmitted by the plurality of remote two-fiber bidirectional optical assemblies correspond to wavelengths of beams received by the plurality of local two-fiber bidirectional optical assemblies. For example, if one of the plurality of remote two-fiber bidirectional optical assemblies transmits a beam whose wavelength is 1267.5 nanometers, one of the plurality of local two-fiber bidirectional optical assemblies receives a beam whose wavelength is 1267.5 nanometers.

Similarly, the local two-fiber bidirectional optical assembly may also transmit a beam of a specific wavelength to the remote two-fiber bidirectional optical assembly by using the optical transmitting module. Details are not described herein again.

In the optical fiber transmission system, each two-fiber bidirectional optical assembly needs to be connected to the multiplexer/demultiplexer by using two optical fibers. Because only one optical fiber is needed to connect one single-fiber bidirectional optical assembly to a multiplexer/demultiplexer, if single-fiber bidirectional optical assemblies are used in the optical fiber transmission system, a quantity of optical fibers can be reduced by half compared with that used in the optical fiber transmission system in which two-fiber bidirectional optical assemblies are used, and system costs can be reduced. One single-fiber bidirectional optical assembly can receive a beam and transmit a beam through one optical fiber. However, the received beam and the transmitted beam need to be distinguished. Currently, a single-fiber bidirectional optical assembly distinguishes between a received beam and a transmitted beam by disposing a light filter. Specifically, a film is coated on the light filter, so that the light filter can reflect a beam whose wavelength is λ1 and transmit a beam whose wavelength is λ2. In this way, the beam whose wavelength is λ1 and the beam whose wavelength is λ2 can be distinguished.

Figure 2:
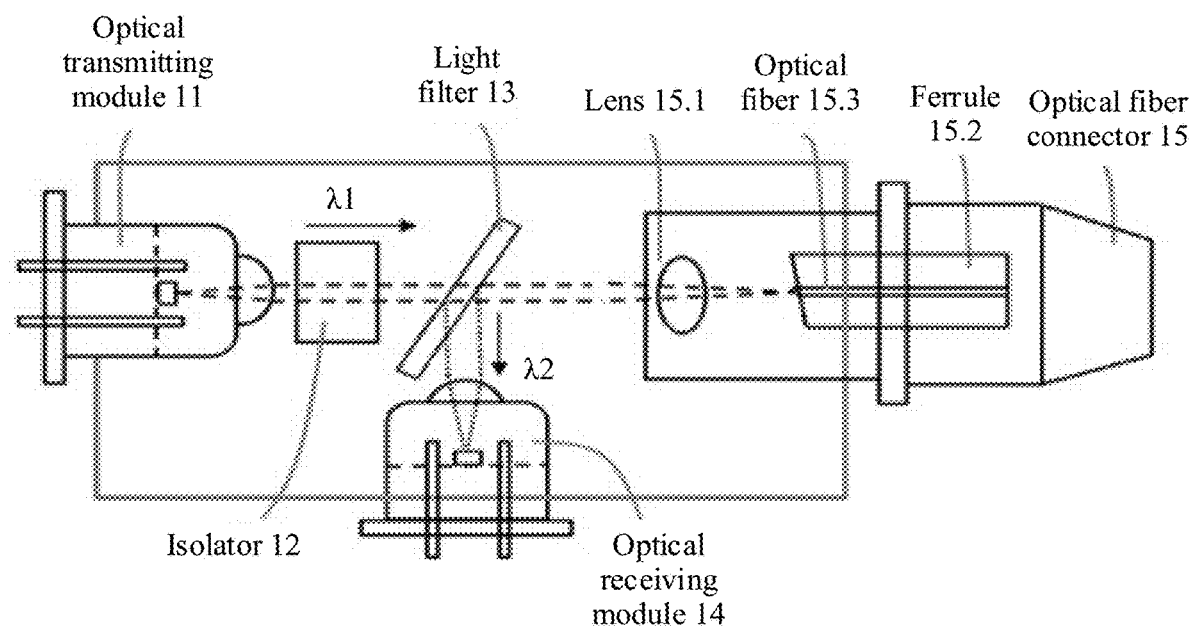
FIG. 2 is a schematic diagram of a structure of a single-fiber bidirectional optical assembly according to this disclosure.

FIG. 2 provides a single-fiber bidirectional optical assembly. The single-fiber bidirectional optical assembly includes an optical transmitting module 11, an isolator 12, a light filter 13, an optical receiving module 14, and an optical fiber connector 15. The optical fiber connector 15 includes a lens 15.1, a ferrule 15.2, and an optical fiber 15.3. The optical fiber 15.3 is disposed in the ferrule 15.2.

The single-fiber bidirectional optical assembly can transmit a beam to the optical fiber 15.3. such as a beam whose wavelength is λ1 by using the optical transmitting module 11, so that the beam enters the light filter 13 through the isolator 12. Further, the optical transmitting module 11 includes a light source and a convex lens, and the convex lens can collimate the beam that is transmitted by the light source and whose wavelength is λ1. A collimated beam enters the isolator 12. The isolator 12 is an optional module in the single-fiber bidirectional optical assembly, and the isolator 12 can allow a beam to pass unidirectionally. For example, as shown in FIG. 2, the beam can only pass through the isolator 12 from left to right, not from right to left. The collimated beam λ1 enters the light filter 13, and enters the connector 15 after being transmitted through the light filter 13. The collimated beam λ1 is converged at a point by the lens 15.1, and then enters the optical fiber 15.3.

The single-fiber bidirectional optical assembly can also receive a beam through the optical fiber 15.3. Refer to FIG. 2. A beam whose wavelength is λ2 enters the single-fiber bidirectional optical assembly (from right to left) through the optical fiber 15.3. The lens 15.1 collimates the beam whose wavelength is λ2. Then, the beam is reflected by the light filter 13, and enters the optical receiving module 14.

Therefore, the single-fiber bidirectional optical assembly shown in FIG. 2 transmits the beam whose wavelength is λ1 through the light filter 13, and reflects the beam whose wavelength is λ2, to distinguish the beam whose wavelength is λ1 from the beam whose wavelength is λ2. According to a current thin-film light filter coating technology, if beams with a smaller wavelength difference need to be distinguished, smaller incident angles of the beams are required. Based on experimental data, if a wavelength difference between two beams is 20 nanometers, both incident angles of the two beams need to be 13°. If the wavelength difference between the two beams is 4.5 nanometers, both the incident angles of the two beams need to be 8.5°. If the wavelength difference between the two beams is 0.8 nanometers, both the incident angles of the two beams need to be 1.8°.

When the wavelength difference between the two beams is small, the incident angles of the beams can be changed by changing an offset angle of the light filter. In this way, a location of the optical receiving module in the single-fiber bidirectional optical assembly needs to be adjusted at the same time, so that the optical receiving module can receive the beams. If the incident angle is small to a specific extent, it is desirable to increase a volume of the single-fiber bidirectional optical assembly, to dispose the optical receiving module in the single-fiber bidirectional optical assembly.

Figure 3:
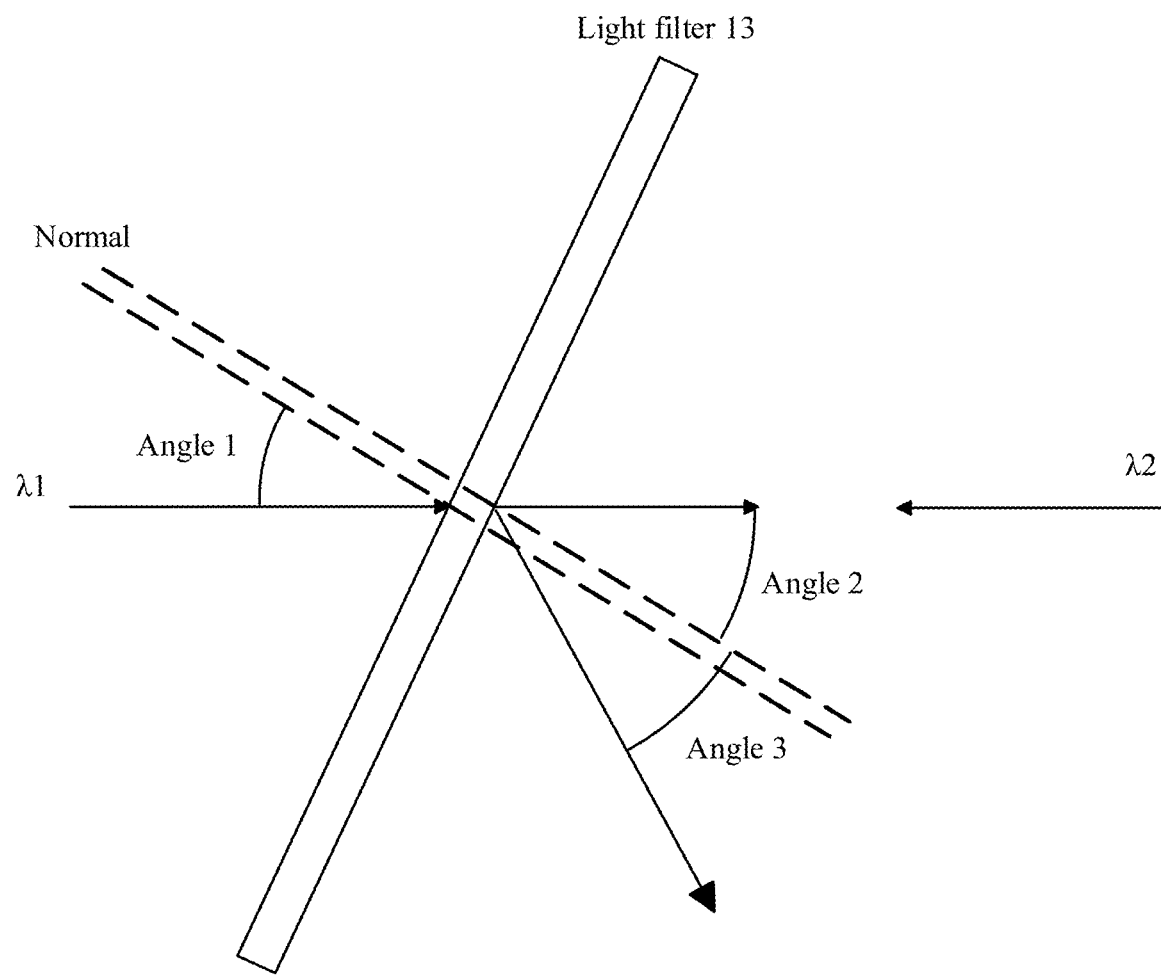
FIG. 3 is a diagram of an optical path in a light filter according to this disclosure.

An optical path diagram shown in FIG. 3 is a diagram of an optical path in the light filter 13 in the single-fiber bidirectional optical assembly in FIG. 2. The beam whose wavelength is λ1 passes through the light filter 13 from left to right, an incident angle of the beam whose wavelength is λ1 is an angle 1, and a refraction angle is an angle 2. The angle 1 is equal to the angle 2. The beam whose wavelength is λ2 is transmitted to the light filter 13 from right to left, and is reflected by the light filter 13. An incident angle of the beam whose wavelength is λ2 is an angle 2, a refraction angle is an angle 3, and the angle 2 is equal to the angle 3. The incident angle of the beam whose wavelength is λ1 is equal to the incident angle of the beam whose wavelength is λ2.

Figure 4:
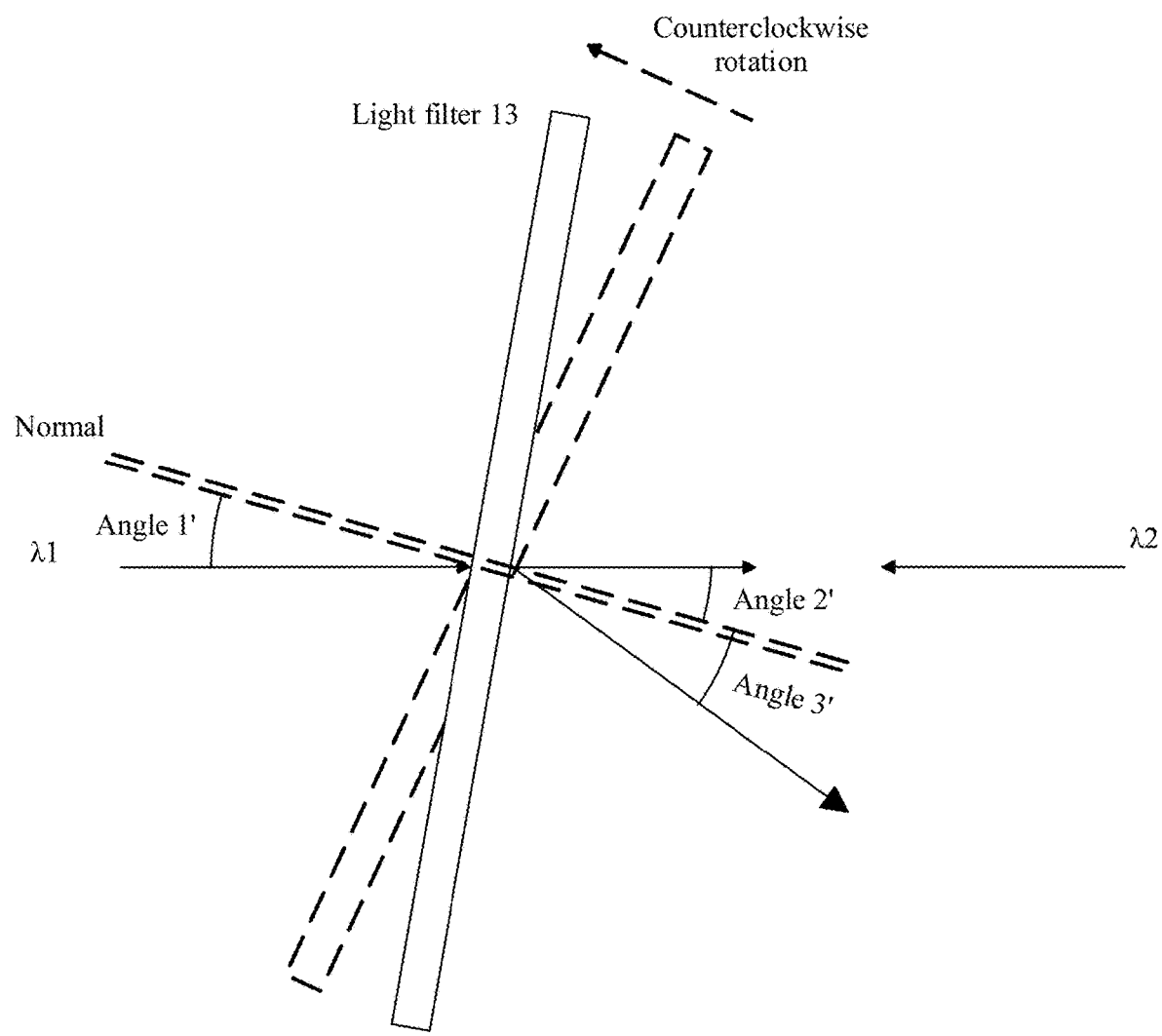
FIG. 4 is a diagram of an optical path in a light filter according to this disclosure.
Figure 5:
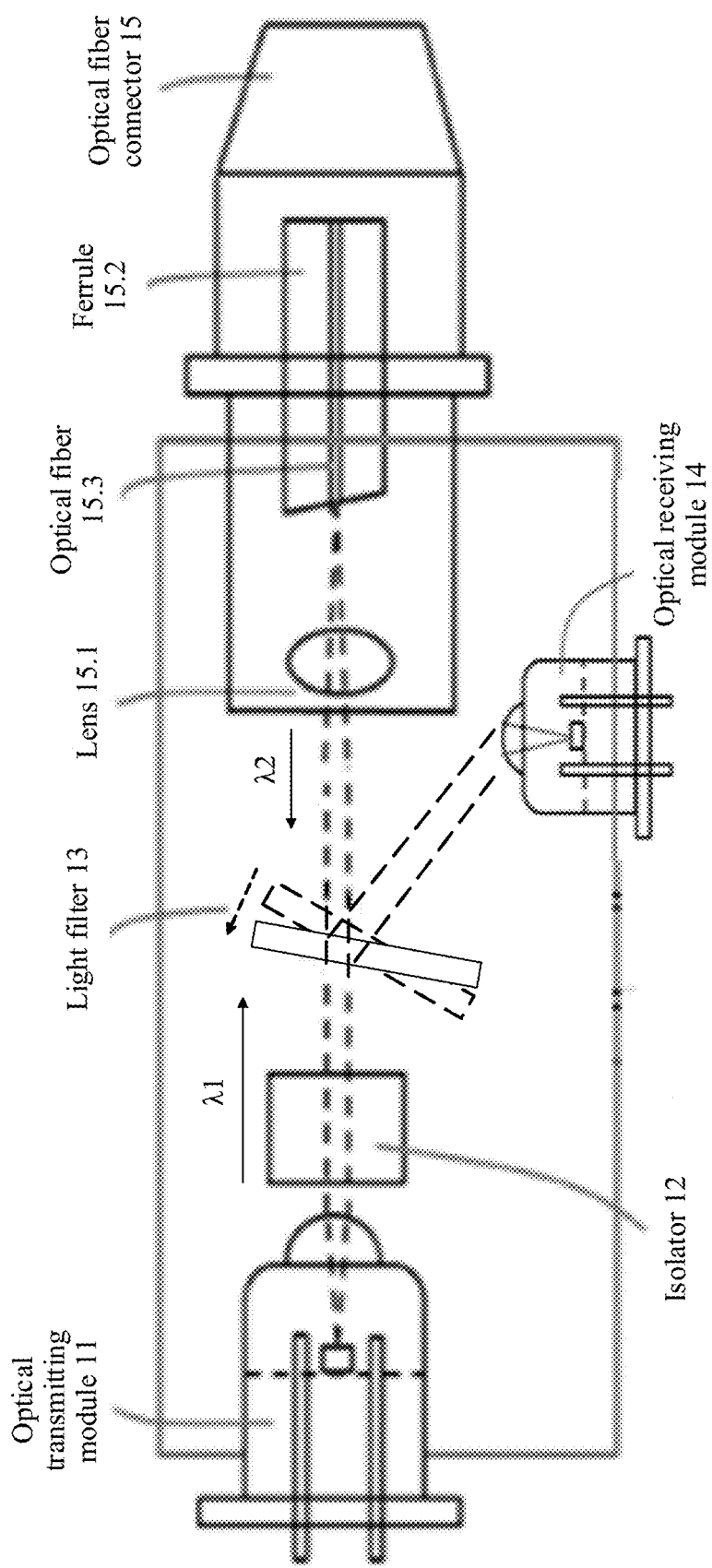
FIG. 5 is a schematic diagram of a structure of a single-fiber bidirectional optical assembly according to this disclosure.

If the light filter needs to distinguish between two beams with a small wavelength difference, incident angles of the two beams should to be adjusted to decrease the incident angles. With reference to FIG. 4, the light filter may be rotated counterclockwise so that the incident angles of two beams are decreased. An angle 1' in FIG. 4 is less than the angle 1 in FIG. 3, and an angle 2' in FIG. 4 is less than the angle 2 in FIG. 3. Refer to FIG. 5. If the light filter 13 is rotated counterclockwise based on the optical path diagram shown in FIG. 4, the location of the optical receiving module 14 should to be synchronously adjusted in the single-fiber bidirectional optical assembly. In FIG. 5, the optical receiving module 14 is moved to the right. Due to a limitation on the volume of the single-fiber bidirectional optical assembly, the location of the optical receiving module 14 cannot be adjusted to the right without a limitation. When an incident angle of a beam is small to a specific extent, the single-fiber bidirectional optical assembly cannot be used if the volume of the single-fiber bidirectional optical assembly is not increased.

Figure 6:
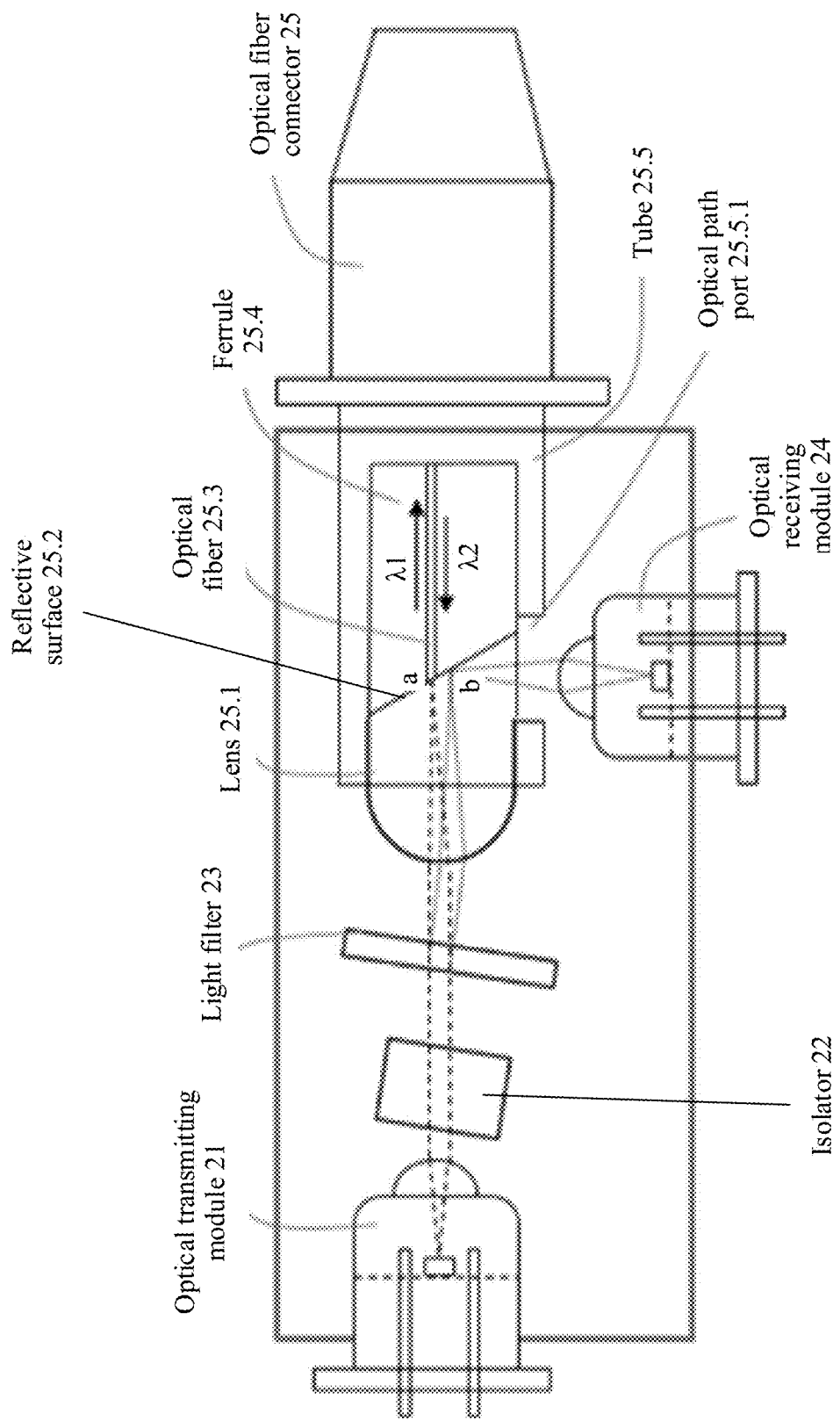
FIG. 6 is a schematic diagram of a structure of a single-fiber bidirectional optical assembly according to this disclosure.

In view of the foregoing problem, Embodiment 1 of this application provides a single-fiber bidirectional optical assembly as shown in FIG. 6. The single-fiber bidirectional optical assembly includes an optical transmitting module 21, an isolator 22, a light filter 23, an optical receiving module 24, and an optical fiber connector 25. The optical receiving module 24 is a first optical module.

The optical fiber connector 25 includes a lens 25.1, an optical fiber 25.3, a ferrule 25.4, and a tube 25.5. The lens 25.1 is laminated to the ferrule 25.4 to form a reflective surface 25.2. The optical fiber 25.3 is inserted into the ferrule 25.4 and is directly connected to the lens 25.1. The ferrule 25.4 is disposed in the tube 25.5. The lens 25.1 and the ferrule 25.4 are laminated to each other and fastened through the tube 25.5. An optical path port 25.5.1 is disposed at a location that is on the tube 25.5 and that corresponds to the optical receiving module 24. The optical receiving module 24 is disposed under the optical path port 25.5.1. The lens 25.1 is an optical path changing module.

When the single-fiber bidirectional optical assembly operates, an optical signal may be transmitted to the optical fiber 25.3. The optical transmitting module 21 transmits an optical signal whose wavelength is 1, and the optical transmitting module 21 includes a light source and a collimation lens. Further, the light source located in a center of the optical transmitting module transmits the optical signal whose wavelength is 1, and the collimation lens collimates the optical signal whose wavelength is 1. A collimated optical signal enters the isolator 22. The isolator 22 is an optional module, and the isolator may be disposed at a location opposite to the collimation lens in the optical transmitting module 21. The isolator 22 can allow the optical signal to pass unidirectionally (in FIG. 6, the isolator is disposed on a right side of the collimation lens, so that the optical signal that is transmitted by the optical transmitting module 21 and whose wavelength is λ1 passes unidirectionally from left to right). The collimated optical signal λ1 enters the light filter 23, and enters the optical fiber connector 25 after being transmitted through the light filter 23. The collimated optical signal λ1 is converged at a point by the lens 25.1, that is, a connection point (a point "a" in FIG. 6) between the optical fiber 25.3 and the lens 25.1. The converged optical signal λ1 enters the optical fiber 25.3.

The single-fiber bidirectional optical assembly can receive the optical signal through the optical fiber 25.3. Refer to FIG. 6. An optical signal whose wavelength is λ2 enters the single-fiber bidirectional optical assembly through the optical fiber 25.3. The lens 25.1 is configured to change a transmission path of the optical signal whose wavelength is λ2. The transmission path includes a first path segment, a second path segment, and a third path segment. The first path segment is a path that is between the optical receiving module 24 and the lens 25.1 (a point "b" in FIG. 6) and that passes through the optical path port 25.5.1. The second path segment is a path between the lens 25.1 (the point b in FIG. 6) and the light filter 23. The third path segment is a path between the light filter 23 and the optical fiber 25.3 (the point "a" in FIG. 6).

The optical signal whose wavelength is λ2 enters the lens 25.1 through the connection point (the point "a" in FIG. 6) between the optical fiber 25.3 and the lens, and is transmitted to the light filter 23 through the third path segment. The lens 25.1 collimates the optical signal whose wavelength is λ2, and transmits a collimated optical signal to the light filter 23.

The optical signal transmitted to the light filter 23 is reflected by the light filter 23, and is transmitted to the point b through the second path segment. The optical signal transmitted to the light filter 23 is reflected by the light filter 23 and enters the lens 25.1 again. The lens 25.1 converges the collimated optical signal λ2 at a point (the point "b" in FIG. 6).

The optical signal transmitted to the point b is reflected by the reflective surface 25.2, and is transmitted to the optical receiving module 24 through the first path segment. After the reflective surface 25.2 reflects the optical signal converged at the point "b", the optical signal whose wavelength is λ2 enters the optical receiving module 24 through the optical path port 25.5.1.

It should be noted that the reflective surface 25.2 is an inclined surface formed between the lens 25.1 and the ferrule 25.4. The ferrule may use a high-reflectivity material, or a reflection-enhancing film may be coated on the inclined surface on which the lens 25.1 is laminated to the ferrule 25.4, to increase reflectivity.

Embodiment 1 of this application provides a single-fiber bidirectional optical assembly. The lens 25.1 in the single-fiber bidirectional optical assembly can change the transmission path of the optical signal whose wavelength is λ2. The optical signal whose wavelength is λ2 is an optical signal that enters the lens 25.1 through the optical fiber 25.3 and that enters the lens 25.1 again after being reflected by the light filter 23. The lens 25.1 can change the transmission path of the optical signal whose wavelength is λ2, so that the optical signal whose wavelength is λ2 enters the optical receiving module 24 through the optical path port 25.5.1. When the single-fiber bidirectional optical assembly distinguishes between beams with a small wavelength difference, after an offset angle of the light filter 23 is changed, the transmission path of the optical signal whose wavelength is λ2 can be changed by the lens 25.1, so that the optical receiving module 24 can receive the optical signal whose wavelength is λ2 through the optical path port 25.5.1. In this way, there is no need to adjust a location of the optical receiving module 24 or increase a volume of the single-fiber bidirectional optical assembly.

In Embodiment 1, a location of the optical transmitting module 21 and the location of the optical receiving module 24 may be interchangeable. For details, refer to FIG. 7. Embodiment 2 provides a single-fiber bidirectional optical assembly. The single-fiber bidirectional optical assembly includes an optical receiving module 31, an isolator 32, a light filter 33, an optical transmitting module 34, and an optical fiber connector 35. The optical transmitting module 34 is a first optical module.

The optical fiber connector 35 includes a lens 35.1, an optical fiber 35.3, a ferrule 35.4, and a tube 35.5. The lens 35.1 is laminated to the ferrule 35.4 to form a reflective surface 35.2. The optical fiber 35.3 is inserted into the ferrule 35.4 and is directly connected to the lens 35.1. The ferrule 35.4 is disposed in the tube 35.5. The lens 35.1 and the ferrule 35.4 are laminated to each other and fastened through the tube 35.5. An optical path port 35.5.1 is disposed at a location that is on the tube 35.5 and that corresponds to the optical transmitting module 34, which is disposed under the optical path port 35.5.1. The lens 35.1 is an optical path changing module.

Figure 7:
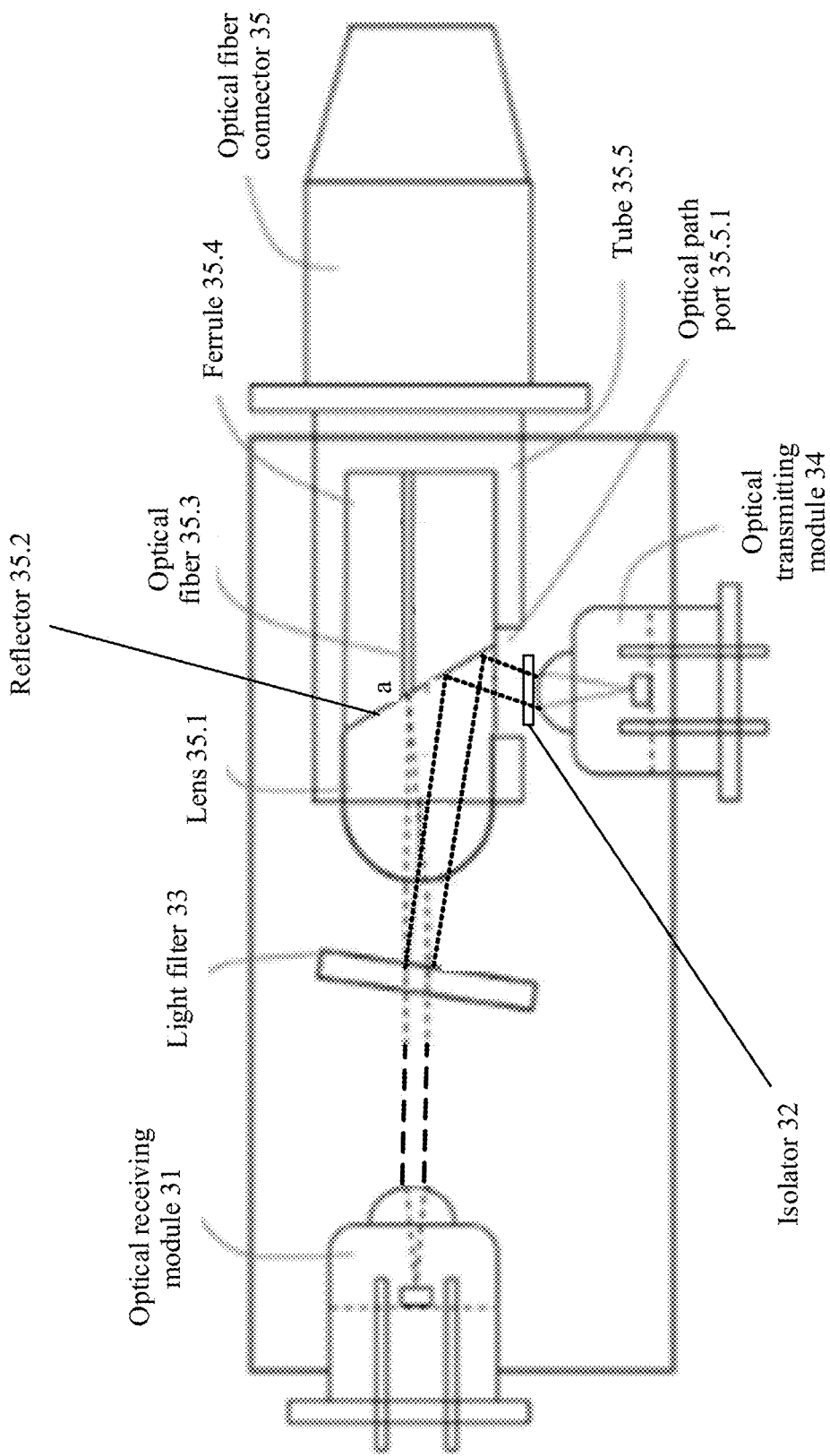
FIG. 7 is a schematic diagram of a structure of a single-fiber bidirectional optical assembly according to this disclosure.

The optical transmitting module 34 can transmit an optical signal whose wavelength is λ3 to the optical fiber 35.3. Refer to FIG. 7. The optical transmitting module 34 transmits the optical signal whose wavelength is λ3, and the lens 35.1 may be configured to change a transmission path of the optical signal whose wavelength is λ3. The transmission path includes a first path segment, a second path segment, and a third path segment. The first path segment is a path that is between the optical transmitting module 34 and the lens 35.1 (the reflective surface 35.2) and that passes through the optical path port 35.5.1. The second path segment is a path between the lens 35.1 (the reflective surface 35.2) and the light filter 33. The third path segment is a path between the light filter 33 and the optical fiber 35.3 (a point "a" in FIG. 7).

After transmitting the optical signal whose wavelength is λ3, the optical transmitting module 34 transmits the optical signal whose wavelength is λ3 to the reflective surface 35.2 through the first path segment. The optical transmitting module 34 transmits the optical signal whose wavelength is λ3, and the optical transmitting module 34 includes a light source and a collimation lens. Further, the light source located in a center of the optical transmitting module transmits the optical signal whose wavelength is λ3, and the collimation lens collimates the optical signal whose wavelength is λ3. A collimated optical signal enters the isolator 32. The isolator 32 is an optional module, and may be disposed opposite to the collimation lens in the optical transmitting module 34. The isolator 32 can allow the optical signal to pass unidirectionally (in FIG. 7, the isolator is disposed above the collimation lens, so that the optical signal that is transmitted by the optical transmitting module 34 and whose wavelength is λ3 passes unidirectionally from bottom to top). The optical signal passing through the isolator 32 is transmitted to the reflective surface 35.2.

The optical signal transmitted to the reflective surface 35.2 is reflected by the reflective surface 35.2, and is transmitted to the light filter 33 through the second path segment. After the optical signal transmitted to and reflected by the reflective surface 35.2, the optical signal enters the lens 35.1 and is transmitted to the light filter 33.

The optical signal transmitted to the light filter 33 is reflected by the light filter 33 and is transmitted to the optical fiber 35.2 through the third path segment. The optical signal transmitted to the light filter 33 is reflected by the light filter 33 again, passes through the lens 35.1 again, and is converged by the lens 35.1 at a point, that is, a connection point (the point "a" in FIG. 7) between the optical fiber 35.3 and the lens 35.1. The converged optical signal λ3 enters the optical fiber 35.3.

The single-fiber bidirectional optical assembly can receive the optical signal through the optical fiber 35.3. With reference to FIG. 7, an optical signal whose wavelength is λ4 enters the single-fiber bidirectional optical assembly through the optical fiber 35.3. The optical signal whose wavelength is λ4 enters the lens 35.1 through the connection point (the point "a" in FIG. 7) between the optical fiber 35.3 and the lens. The lens 35.1 collimates the optical signal whose wavelength is λ4, and a collimated optical signal λ4 is transmitted through the light filter 33 to enter the optical receiving module 31. The optical receiving module 31 may include a convergent lens and a photodetector, where the convergent lens can converge the optical signal whose wavelength is λ4 into the photodetector.

It should be noted that the reflective surface 35.2 is an inclined surface formed between the lens 35.1 and the ferrule 35.4. The ferrule may use a high-reflectivity material, or a reflection-enhancing film may be coated on the inclined surface on which the lens 35.1 is laminated to the ferrule 35.4, to increase reflectivity.

Embodiment 2 provides a single-fiber bidirectional optical assembly. The lens in the single-fiber bidirectional optical assembly can change the transmission path of the optical signal whose wavelength is λ3. The optical signal whose wavelength is λ3 is an optical signal that is transmitted by the optical transmitting module 34 and that enters the lens 35.1 through the optical path port 35.5.1. The lens 35.1 can change a propagation path of the optical signal whose wavelength is λ3, so that the optical signal whose wavelength is λ3 enters the optical fiber 35.3. When the single-fiber bidirectional optical assembly distinguishes between beams with a small wavelength difference, after an offset angle of the light filter 33 is changed, the transmission path of the optical signal whose wavelength is λ3 can be changed by the lens 35.1 so that the optical transmitting module 34 can transmit the optical signal whose wavelength is λ3 through the optical path port 35.5.1. In this way, there is no need to adjust a location of the optical transmitting module 34 or increase a volume of the single-fiber bidirectional optical assembly.

Figure 8:
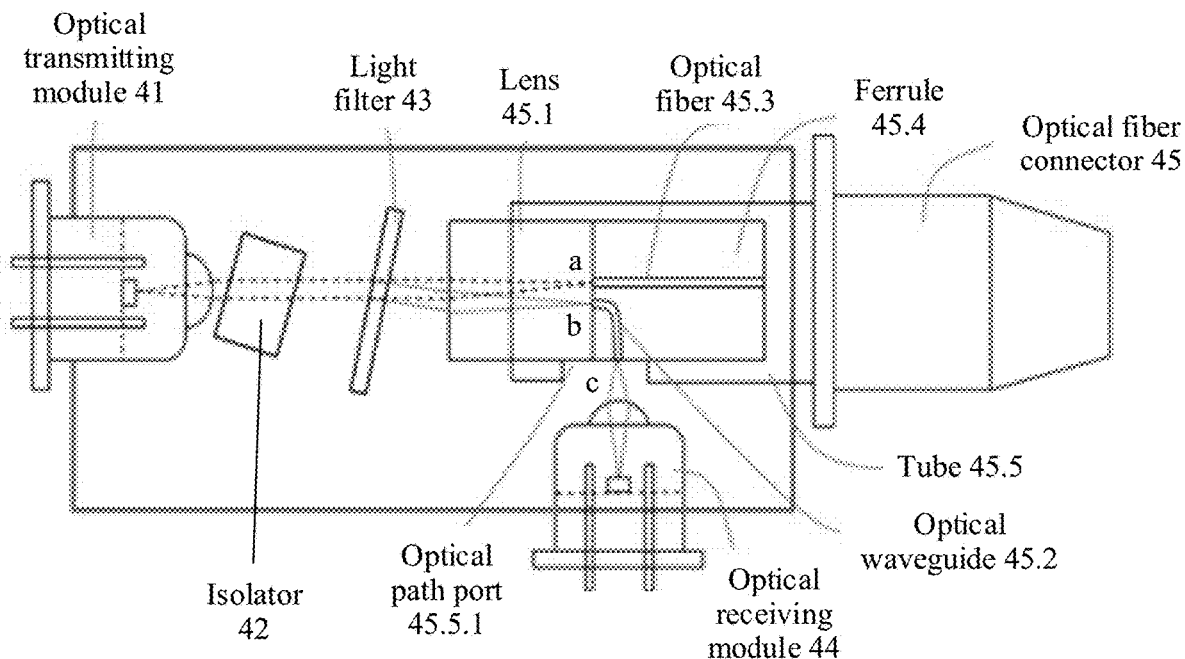
FIG. 8 is a schematic diagram of a structure of a single-fiber bidirectional optical assembly according to this disclosure.

In the foregoing two implementations, the optical path changing module is a lens. In another implementation, the optical path changing module may alternatively include a lens and an optical waveguide. With reference to FIG. 8, embodiment 3 provides another single-fiber bidirectional optical assembly. The single-fiber bidirectional optical assembly shown in FIG. 8 includes an optical transmitting module 41, an isolator 42, a light filter 43, an optical receiving module 44, and an optical fiber connector 45.

The optical fiber connector 45 includes a lens 45.1, an optical waveguide 45.2, an optical fiber 45.3, a ferrule 45.4, and a tube 45.5. An optical path changing module includes the lens 45.1 and the optical waveguide 45.2. The lens 45.1 is laminated to the ferrule 45.4. The optical fiber 45.3 is inserted into the ferrule 45.4 and is directly connected to the lens 45.1, and a connection point is a point a in FIG. 8. The ferrule 45.4 is disposed in the tube 45.5. The lens 45.1 and the ferrule 45.4 are laminated to each other and fastened through the tube 45.5. An optical path port 45.5.1 is disposed at a location that is on the tube 45.5 and that corresponds to the optical receiving module 44. The optical receiving module 44 is disposed under the optical path port 45.5.1. The optical waveguide 45.2 is disposed in the ferrule 45.4, one end of the optical waveguide 45.2 is connected to the lens 45.1, and a connection point is a point "b" in FIG. 8. The other end of the optical waveguide 45.2 is connected to the optical path port 45.5.1 of the tube 45.5, and a connection point is a point "c" in FIG. 8. The optical waveguide 45.2 is configured to transmit an optical signal received at the point "b" to the point "c".

When the single-fiber bidirectional optical assembly operates, an optical signal may be transmitted to the optical fiber 45.3. The optical transmitting module 41 transmits an optical signal whose wavelength is λ5, and the optical transmitting module 41 includes a light source and a collimation lens. Further, the light source located in a center of the optical transmitting module transmits the optical signal whose wavelength is λ5, and the collimation lens collimates the optical signal whose wavelength is λ5. A collimated optical signal enters the isolator 42. The isolator 42 is an optional module, and may be disposed opposite to the collimation lens in the optical transmitting module 41. The isolator 42 can allow the optical signal to pass unidirectionally (in FIG. 8, the isolator is disposed on a right side of the collimation lens so that the optical signal that is transmitted by the optical transmitting module 41 and whose wavelength is λ5 passes unidirectionally from left to right). The collimated optical signal λ5 enters the light filter 43, and enters the optical fiber connector 45 after being transmitted through the light filter 43. The collimated optical signal λ5 is converged at a point by the lens 45.1, that is, the connection point (the point "a" in FIG. 8) between the optical fiber 45.3 and the lens 45.1. The converged optical signal λ5 enters the optical fiber 45.3.

The single-fiber bidirectional optical assembly can receive the optical signal through the optical fiber 45.3. With reference to FIG. 8, an optical signal whose wavelength is λ6 enters the single-fiber bidirectional optical assembly through the optical fiber 45.3. The lens 45.1 is configured to change a transmission path of the optical signal whose wavelength is M. The transmission path includes a first path segment, a second path segment, and a third path segment. The first path segment is a path that is between the optical receiving module 44 and the point "b" in the optical waveguide and that passes through the optical path port 45.5.1. The second path segment is a path between the point "b" and the light filter 43. The third path segment is a path between the light filter 43 and the optical fiber 45.3 (the point a in FIG. 8).

The single-fiber bidirectional optical assembly can receive the optical signal whose wavelength is λ6 through the optical fiber 45.3. Referring to FIG. 8, the optical signal whose wavelength is λ6 enters the single-fiber bidirectional optical assembly through the optical fiber 45.3 and is transmitted to the light filter 43 through the third path segment. The optical signal whose wavelength is λ6 enters the lens 45.1 through the connection point (the point "a" in FIG. 8) between the optical fiber 45.3 and the lens. The lens 45.1 collimates the optical signal whose wavelength is λ6, and transmits a collimated optical signal to the light filter 43.

The optical signal transmitted to the light filter 43 is reflected by the light filter and is transmitted to the point "b" through the second path segment. The optical signal transmitted to the light filter 43 is reflected by the light filter 43 and enters the lens 45.1 again. The lens 45.1 converges the collimated optical signal at a point (the point "b" in FIG. 8).

The optical signal transmitted to the point "b" is transmitted to the optical receiving module 44 through the first path segment. The optical waveguide 45.2 transmits the optical signal converged at the point "b" to the optical path port 45.5.1, so that the optical signal whose wavelength is λ6 enters the optical receiving module 44.

Embodiment 3 provides a single-fiber bidirectional optical assembly. The optical path changing module in the single-fiber bidirectional optical assembly can change the transmission path of the optical signal whose wavelength is M. The optical signal whose wavelength is λ6 enters the lens 45.1 through the optical fiber 45.3, and enters the lens 45.1 again after being reflected by the light filter 43. The lens 45.1 can change the transmission path of the optical signal whose wavelength is λ6 so that the optical signal whose wavelength is λ6 enters the optical receiving module 44 through the optical path port 45.5.1. When the single-fiber bidirectional optical assembly distinguishes between beams with a small wavelength difference, after an offset angle of the light filter 43 is changed, the transmission path of the optical signal whose wavelength is λ6 can be changed by the lens 45.1 so that the optical receiving module 44 can receive the optical signal whose wavelength is λ6 through the optical path port 45.5.1. In this way, there is no need to adjust a location of the optical receiving module 44 or increase a volume of the single-fiber bidirectional optical assembly.

In the single-fiber bidirectional optical assembly shown in FIG. 8, a location of the optical transmitting module 41 and the location of the optical receiving module 44 may be interchangeable. For details, refer to FIG. 9. Embodiment 4 provides another single-fiber bidirectional optical assembly. The single-fiber bidirectional optical assembly includes an optical receiving module 51, an isolator 52, a light filter 53, an optical transmitting module 54, and an optical fiber connector 55.

The optical fiber connector 55 includes a lens 55.1, an optical waveguide 55.2, an optical fiber 55.3, a ferrule 55.4, and a tube 55.5. An optical path changing module includes the lens 55.1 and the optical waveguide 55.2. The lens 55.1 is laminated to the ferrule 55.4. The optical fiber 55.3 is inserted into the ferrule 55.4 and is directly connected to the lens 55.1, and a connection point is a point a in FIG. 9. The ferrule 55.4 is disposed in the tube 55.5. The lens 55.1 and the ferrule 55.4 are laminated to each other and fastened through the tube 55.5. An optical path port 55.5.1 is disposed at a location that is on the tube 55.5 and that corresponds to the optical receiving module 51. The optical receiving module 51 is disposed under the optical path port 55.5.1. The optical waveguide 55.2 is disposed in the ferrule 55.4, one end of the optical waveguide 55.2 is connected to the lens 55.1, and a connection point is a point "b" in FIG. 9. The other end of the optical waveguide 55.2 is connected to the optical path port 55.5.1 of the tube 55.5, and a connection point is a point "c" in FIG. 9. The optical waveguide 55.2 is configured to transmit an optical signal received at the point b to the point c.

The optical transmitting module 54 can transmit an optical signal whose wavelength is λ7 to the optical fiber 55.3. Within reference to FIG. 9, the optical transmitting module 54 transmits the optical signal whose wavelength is λ7, and the lens 55.1 may be configured to change a transmission path of the optical signal whose wavelength is λ7. The transmission path includes a first path segment, a second path segment, and a third path segment. The first path segment is a path that is between the optical transmitting module 54 and the point "b" in the optical waveguide and that passes through the optical path port 55.5.1. The second path segment is a path between the point "b" and the light filter 53. The third path segment is a path between the light filter 53 and the optical fiber 55.3 (the point "a" in FIG. 9).

After transmitting the optical signal whose wavelength is λ7, the optical transmitting module 54 transmits the optical signal whose wavelength is λ7 to the point "b" through the first path segment. The optical transmitting module 54 transmits the optical signal whose wavelength is λ7, and the optical transmitting module 54 includes a light source and a collimation lens. Further, the light source located in a center of the optical transmitting module transmits the optical signal whose wavelength is λ7, and the collimation lens collimates the optical signal whose wavelength is λ7. A collimated optical signal enters the isolator 52. The isolator 52 is an optional module and may be disposed opposite to the collimation lens in the optical transmitting module 54. The isolator 52 can allow the optical signal to pass unidirectionally (in FIG. 9, the isolator is disposed above the collimation lens, so that the optical signal that is transmitted by the optical transmitting module 54 and whose wavelength is λ7 passes unidirectionally from bottom to top). After passing through the optical path port 55.5.1, the collimated optical signal λ7 enters the optical waveguide 55.2 through the point "c" and is transmitted to the point "b".

The optical signal transmitted to the point "b" is transmitted to the light filter 53 through the second path segment. In this manner, the optical signal transmitted to the point "b" is transmitted to the light filter 53 through the lens 55.1.

The optical signal transmitted to the light filter 53 is reflected by the light filter 53, and is transmitted to the optical fiber 55.3 through the third path segment. The optical signal transmitted to the light filter 53 is reflected by the light filter 53 again, passes through the lens 55.1 again, and is converged at a point by the lens 55.1, that is, the connection point (the point "a" in FIG. 9) between the optical fiber 55.3 and the lens 55.1. The converged optical signal λ7 enters the optical fiber 55.3.

Figure 9:
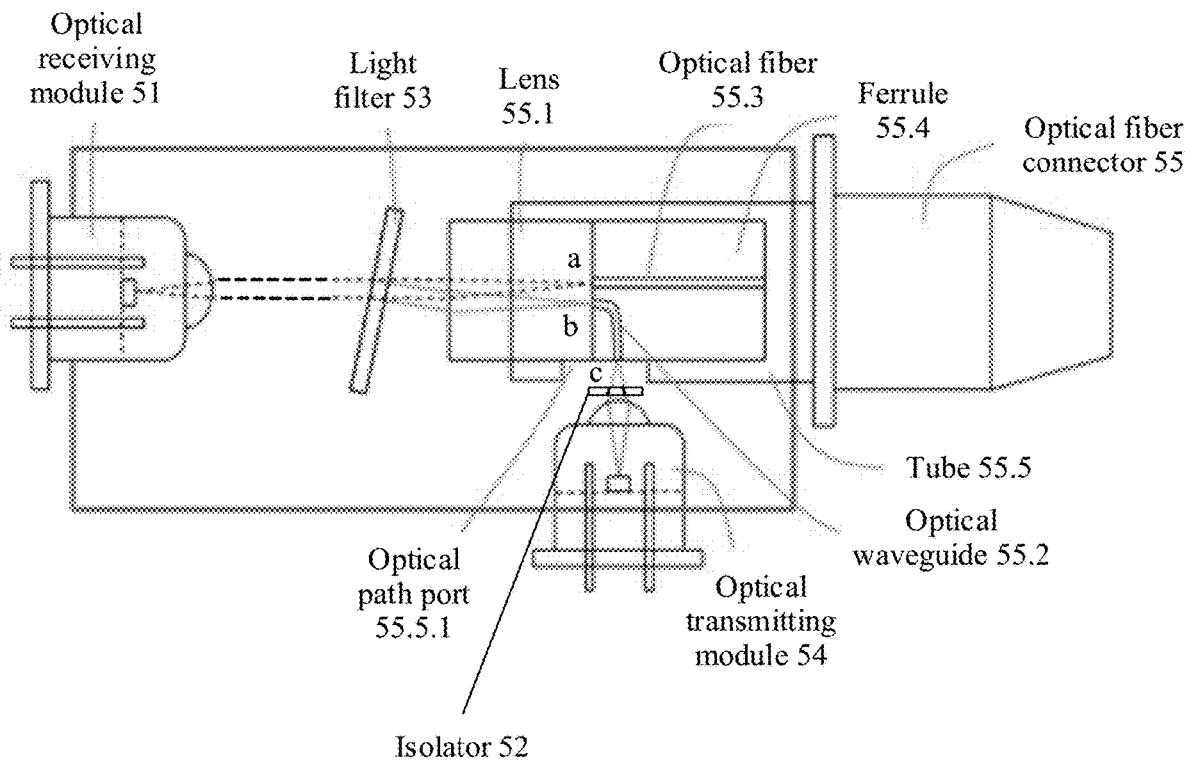
FIG. 9 is a schematic diagram of a structure of a single-fiber bidirectional optical assembly according to this disclosure.

The single-fiber bidirectional optical assembly can receive the optical signal through the optical fiber 55.3. With reference to FIG. 9, an optical signal whose wavelength is λ8 enters the single-fiber bidirectional optical assembly through the optical fiber 55.3. Specifically, the optical signal whose wavelength is λ8 enters the lens 55.1 through the connection point (the point "a" in FIG. 9) between the optical fiber 55.3 and the lens. The lens 55.1 collimates the optical signal whose wavelength is λ8, and a collimated optical signal is transmitted through the light filter 53 to enter the optical receiving module 51. The optical receiving module 51 may include a convergent lens and a photodetector, where the convergent lens can converge into the photodetector the optical signal whose wavelength is λ8.

Embodiment 4 provides a single-fiber bidirectional optical assembly. The optical path changing module in the single-fiber bidirectional optical assembly can change the transmission path of the optical signal whose wavelength is λ7. The optical signal whose wavelength is λ7 is an optical signal that is transmitted by the optical transmitting module 54 and that enters the optical waveguide 55.2 through the optical path port 55.5.1. The lens 55.1 can change a propagation path of the optical signal whose wavelength is λ7 so that the optical signal whose wavelength is λ7 enters the optical fiber 55.3. When the single-fiber bidirectional optical assembly distinguishes between beams with a small wavelength difference, after an offset angle of the light filter 53 is changed, the transmission path of the optical signal whose wavelength is λ7 can be changed by the lens 55.1 so that the optical transmitting module 54 can transmit the optical signal whose wavelength is λ7 through the optical path port 55.5.1. In this way, there is no need to adjust a location of the optical transmitting module 54 or increase a volume of the single-fiber bidirectional optical assembly.

A material of the tube included in each of the single-fiber bidirectional optical assemblies in Embodiment 1 to Embodiment 4 is not limited. For example, the material of the tube may be plastic or metal. The optical transmitting module may be a transmitter optical subassembly (TOSA), or may be another type of optical transmitting assembly. This is not limited herein. The optical receiving module may be a receiver optical subassembly (ROSA), or may be another type of optical receiving assembly. This is not limited herein. The lens includes but is not limited to a gradient refractive index lens, a self-focusing lens, and a Grin lens.

It should be noted that Embodiment 1 to Embodiment 4 provide four single-fiber bidirectional optical assemblies. The optical fiber connector in the single-fiber bidirectional optical assembly may be independently manufactured into a product. A use range of the optical fiber connector is not limited to the single-fiber bidirectional optical assemblies described in Embodiment 1 to Embodiment 4. For a structure and a function of the optical fiber connector, refer to Embodiment 1 to Embodiment 4. Details are not described herein again.

Embodiment 5 provides an optical fiber transmission system. In this system, a same quantity of single-fiber bidirectional optical assemblies are separately disposed at a remote end and a local end, and a multiplexer/demultiplexer is separately disposed at the remote end and the local end. Each single-fiber bidirectional optical assembly is connected to only one optical fiber, and transmits an optical signal and receives an optical signal through one optical fiber. The single-fiber bidirectional optical assembly is the single-fiber bidirectional optical assembly described in any one of Embodiment 1 to Embodiment 4.

Figure 10:
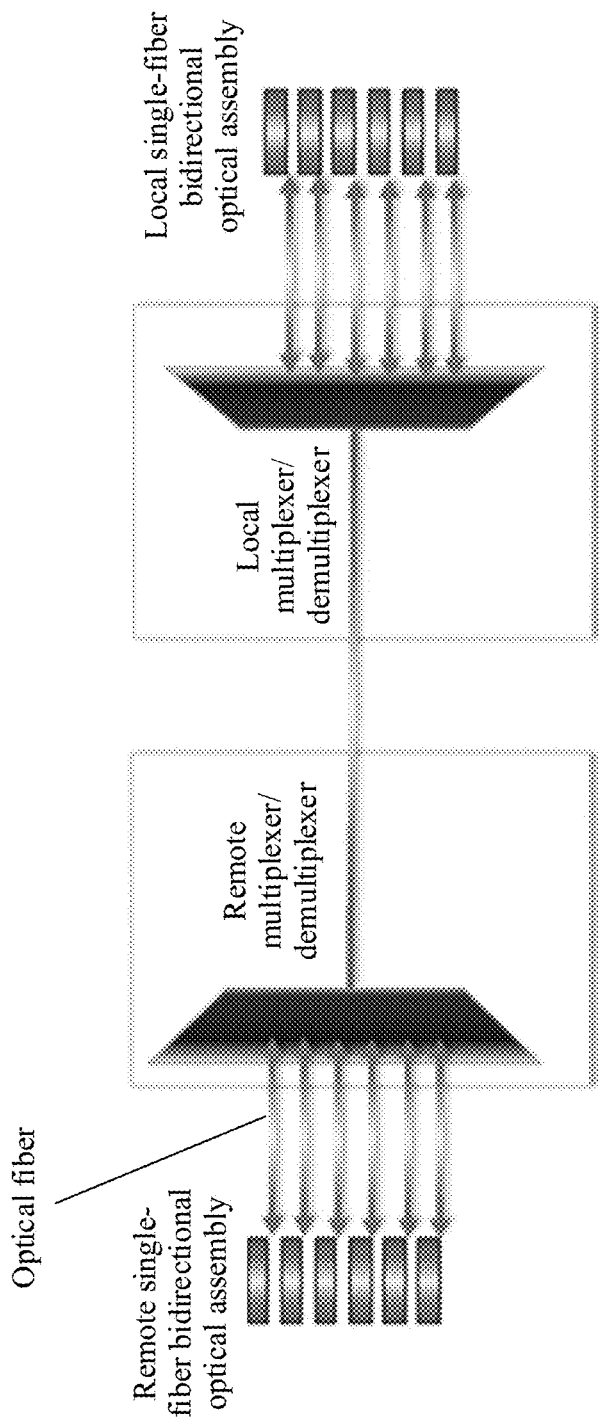
FIG. 10 is a schematic diagram of a structure of an optical fiber transmission system according to this disclosure.

For example, referring to FIG. 10, the optical fiber transmission system has six single-fiber bidirectional optical assemblies at each of the remote end and the local end, and one multiplexer/demultiplexer is separately disposed at the remote end and the local end. Each single-fiber bidirectional optical assembly is connected to one optical fiber. When the optical fiber transmission system operates, an optical transmitter in the remote single-fiber bidirectional optical assembly can transmit a beam to the remote multiplexer/demultiplexer through the optical fiber. The remote multiplexer/demultiplexer can combine beams transmitted by a plurality of remote single-fiber bidirectional optical assemblies, and then transmit a combined beam to the local multiplexer/demultiplexer through one optical fiber. The local multiplexer/demultiplexer splits the received beam into a plurality of beams, and transmits the beams to corresponding local single-fiber bidirectional optical assemblies in a plurality of local single-fiber bidirectional optical assemblies, respectively. The local single-fiber bidirectional optical assembly receives the beam by using an optical receiver. It should be noted that wavelengths of beams transmitted by the plurality of remote single-fiber bidirectional optical assemblies correspond to wavelengths of beams received by the plurality of local single-fiber bidirectional optical assemblies. For example, if one of the plurality of remote single-fiber bidirectional optical assemblies transmits a beam whose wavelength is 1267.5 nanometers, one of the plurality of local single-fiber bidirectional optical assemblies receives a beam whose wavelength is 1267.5 nanometers.

Similarly, the local single-fiber bidirectional optical assembly may also transmit a beam of a specific wavelength to the remote single-fiber bidirectional optical assembly by using the optical transmitter. Details are not described herein again.

The optical fiber connector, the single-fiber bidirectional optical assembly, and the optical fiber transmission system provided in embodiments of the present invention are described in detail above. The principle and implementation of the present invention are described herein through specific examples. The description about the foregoing embodiments is merely provided to help understand the method and core ideas of the present invention. In addition, persons of ordinary skill in the art can make variations and modifications to the present invention in terms of the specific implementations and application scopes according to the ideas of the present disclosure. Therefore, the content of this specification shall not be construed as a limit to the present disclosure, and while the disclosure provides a detailed description with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments.

What is claimed is:

1. A single fiber bidirectional optical optical assembly, comprising:
   a fiber connector comprising an optical path changing module, an optical fiber, a ferrule, and a tube;
   a first optical module; and
   a light filter, wherein:
   the optical fiber is disposed in the ferrule, the optical path changing module is in physical contact with the ferrule, the optical path changing module and the ferrule being secured through the tube, and an optical path port is disposed at a location that is on the tube and that opposites to the first optical module; and
   the optical path changing module is configured to change a transmission path of a first optical signal, wherein the first optical signal is an optical signal that enters the optical path changing module after being reflected by the light filter, or an optical signal that is transmitted by the first optical module and that enters the optical path changing module through the optical path port; and the transmission path comprises a first path segment, a second path segment, and a third path segment, wherein the first path segment is a path that is between the first optical module and the optical path changing module and that passes through the optical path port, the second path segment is a path between the optical path changing module and the light filter, and the third path segment is a path between the light filter and the optical fiber.

2. The optical assembly according to claim 1, wherein when the first optical module is an optical receiving module; and
   the optical path changing module is configured to transmit, to the light filter through the third path segment, a second optical signal received from the optical fiber, and transmit reflected light from the second path segment to the optical receiving module through the first path segment, wherein the reflected light is obtained through reflection of the second optical signal by the light filter.

3. The optical assembly according to claim 1, wherein the optical path changing module is a lens, and the lens and the ferrule are laminated to form a reflective surface; and the reflective surface is configured to reflect an optical signal that enters the lens after being reflected by the light filter, or is configured to reflect the optical signal that enters the lens through the optical path port.

4. The optical assembly according to claim 1, wherein the optical path changing module comprises a lens and an optical waveguide, wherein:

the optical waveguide is disposed in the ferrule, one end of the optical waveguide is connected to the lens, and the other end of the optical waveguide is connected to the optical path port of the tube, the optical waveguide being configured to transmit, to the optical path port, an optical signal that enters the lens after being reflected by the light filter, or is configured to transmit, to the lens, an optical signal that enters the optical waveguide through the optical path port.

5. A single-fiber bidirectional optical assembly, comprising:

an optical fiber connector, a first optical module, and a light filter, the optical fiber connector comprising an optical path changing module, an optical fiber, a ferrule, and a tube, wherein:

the optical fiber is disposed in the ferrule, the optical path changing module is in physical contact with the ferrule, the optical path changing module and the ferrule being secured through the tube, and an optical path port is disposed at a location that is on the tube generally opposed from the first optical module;

the optical path changing module is configured to change a transmission path of a first optical signal, wherein the first optical signal is an optical signal that enters the optical path changing module after being reflected by the light filter, or an optical signal that is transmitted by the first optical module and that enters the optical path changing module through the optical path port; and the transmission path comprises a first path segment, a second path segment, and a third path segment, wherein the first path segment is a path that is between the first optical module and the optical path changing module and that passes through the optical path port, the second path segment is a path between the optical path changing module and the light filter, and the third path segment is a path between the light filter and the optical fiber.

6. The single-fiber bidirectional optical assembly according to claim 5, wherein when the first optical module is an optical transmitting module configured to:

transmit a third optical signal from the first path segment to the light filter through the second path segment, and transmit, to the optical fiber through the third path segment, reflected light obtained through reflection of the third optical signal by the light filter, wherein the third optical signal is transmitted by the optical transmitting module through the first path segment.

7. The single-fiber bidirectional optical assembly according to claim 5, wherein the optical path changing module is a lens, and the lens and the ferrule are laminated to form a reflective surface; and the reflective surface is configured to reflect an optical signal that enters the lens after being reflected by the light filter, or is configured to reflect the optical signal that enters the lens through the optical path port.

8. The single-fiber bidirectional optical assembly according to claim 5, wherein the optical path changing module comprises a lens and an optical waveguide, wherein:

the optical waveguide is disposed in the ferrule, one end of the optical waveguide is connected to the lens, and the other end of the optical waveguide is connected to the optical path port of the tube; and the optical waveguide is configured to transmit, to the optical path port, an optical signal that enters the lens after being reflected by the light filter, or is configured to transmit, to the lens, an optical signal that enters the optical waveguide through the optical path port.

* * * * *